Figure 1:
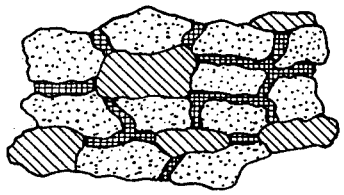

Aug. 25, 1959   J. B. HUFFADINE ET AL   2,901,442
RESISTORS AND RESISTOR MATERIALS
Filed Feb. 24, 1958

- CARBON
- MOLYBDENUM DISILICIDE
- ALUMINA

2,901,442
RESISTORS AND RESISTOR MATERIALS

John B. Huffadine and Roy W. Sanders, Northampton, England, assignors to The Plessey Company Limited, Ilford, England, a British company Application February 24, 1958, Serial No. 717,267

Claims priority, application Great Britain May 15, 1957

11 Claims. (Cl. 252—508)

This invention relates to electrical resistors and has for an object to provide resistors suitable for use at temperatures above 150° C. and materials for such resistors.

A more specific object of the invention is the provision of an improved resistor which, while carbon is used as the main resistive material, is nevertheless suitable for extended periods of use at temperatures above 150° C.

According to one aspect of the invention the resistor comprises a resistive body consisting of a compact sintered mixture of molybdenum disilicide particles and alumina particles of such mixture ratio as would normally result in the material being an insulator, adjacent molybdenum disilicide particles being separated by alumina particles, wherein the insulation between adjacent molybdenum disilicide particles is bridged resistively by the incorporation of elemental carbon in the sintered mixture. From another aspect the invention consists in a sintered resistive compact mixture of molybdenum disilicide particles and alumina particles and elemental carbon, the mixture ratio of the molybdenum disilicide particles and alumina particles being such as would, in the absence of the carbon, produce a sintered body of insulating character.

The invention also provides a method of making resistor material that is suitable for use at high temperatures, which comprises forming a powderous mixture of molybdenum disilicide particles, alumina particles and elemental carbon wherein the amount of molybdenum disilicide in relation of that of alumina is smaller than that which in the absence of carbon would result in the formation of a conductive body after sintering, and sintering the said mixture under compression pressure to form a compact sintered resistive body. The sintering under pressure is preferably effected in a graphite die. Alternatively useful resistors may probably also be made by cold-pressing the mixture and then effecting sintering in an inert atmosphere without the application of pressure during sintering.

According to a feature of the invention parts of the mould may be filled with a mixture richer in molybdenum disilicide for low resistance connection to external conductors. The said portions may consist solely of molybdenum disilicide or of molybdenum disilicide mixed with not more than equal parts by weight of alumina. External connectors may be attached to the low resistance parts of the body by brazing or the like. The incorporation of carbon in the mixture can be effected by coating the particles of the mixed powder, or preferably only the alumina powder particles, with a thin layer of carbon prior to the hot pressing, for example by the decomposition of carbonaceous gas.

In order to obtain good resistance to oxidation of the finished resistor, the coating with carbon should be applied to the alumina particles only, the coated alumina particles being then mixed with the molybdenum disilicide by, for example ball-milling.

The invention will be more readily understood on the basis of the following considerations.

Resistors used in the electronic industry frequently employ carbon either in the form of particles or films as the resistive material. Although carbon is comparatively stable electrically at temperatures in excess of 150° C., the temperature of operation of such resistors is limited to about 150° C. for two reasons:

(a) The carbon begins to be attacked by oxygen at higher temperatures.

(b) The attachment of electrical contacts to the resistor material becomes difficult when operating temperatures are likely to exceed 150° C.

Molybdenum disilicide and alumina have co-efficients of thermal expansion which are substantially similar over the range of temperature 0–1000° C., and when the two materials in powdered form are hot compacted in a graphite die, they are capable of bonding firmly to each other to form a non-porous composite body which is not readily destroyed by change of temperature. A body hot pressed from a mixture of molybdenum disilicide and alumina powders is either electrically conductive or insulating according to whether the disilicide is continuous or not, and the transition is quite rapid. If a composition is chosen such that on hot pressing an insulating material would result, and if the particles of the mixed powder are ocated with a thin layer of carbon prior to hot pressing, then during hot pressing any carbon in contact with molybdenum disilicide will react with it and be absorbed, but that in contact with alumina will be unaffected. The structure of the resultant hot pressed material is believed to be as shown diagrammatically in Figure 1. The resistive path through the hot-pressed body will consist of comparatively short lengths of carbon film connected together electrically by particles of molybdenum disilicide. In a normal carbon resistor, the fact that the carbon film is continuous (which it must be if the material is not to be an insulator) means that oxidation can occur through-out the specimen, the rate of the process being determined by diffusion of oxygen into the body of the specimen.

In a resistor according to the invention as illustrated, oxidation can proceed along the carbon film only until a particle of molybdenum disilicide is reached. The latter is highly resistant to oxidation and thus carbon lying beyond such a particle is protected from oxidation. The resistor may therefore be used at higher temperatures than one which is not so protected according to the invention.

During the hot pressing operation, contacts of molybdenum disilicide or of a conductive mixture of molybdenum disilicide and alumina (such as to yield a conductive body when hot pressed) may be applied to the ends of the resistive element and bonded into place by sintering. Leads may subsequently be attached to these contacts by brazing, thus yielding an assembly capable of being operated at comparatively high temperatures.

One way of carrying out the invention is as follows:

About 5 gm. of alumina powder (particle size approximately $1\mu$) are placed in a furnace and heated to 1000° C. in a stream of oxygen-free nitrogen. At this temperature the nitrogen is replaced by methane for a period of 20 minutes, during which time carbon is deposited on each particle of powder. The powder is then allowed to cool in oxygen-free nitrogen. When cool it is mixed in a ball-mill with molybdenum disilicide powder (particle size $2–5\mu$) in the proportions 72% coated alumina to 28% molybdenum disilicide by weight.

Figure 2:
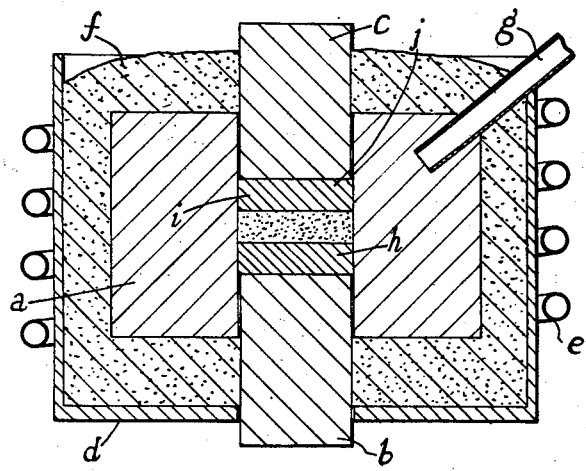

The mixture thus obtained is placed in a graphite die, together with a powder to form end contacts as shown in Figure 2. The composition of the contacts may vary from 100% molybdenum disilicide to a mixture of 50% molybdenum disilicide with 50% (by weight) of alumina.

Figure 2 illustrates diagrammatically the hot sintering operation employed to produce one form of resistor according to the invention.

A mould cavity is formed in a graphite die *a* between two graphite punches *b* and *c*. After withdrawing the upper punch *c*, the mould cavity is filled by forming therein first a layer *h* of a mixture consisting of equal parts by weight of molybdenum disilicide and alumina, which is followed by a layer *i* of the resistance forming mixture of molybdenum disilicide, alumina and carbon, and finally a top layer *j* again consisting of the conductive mixture of equal parts of molybdenum disilicide and alumina. The two outer layers of these can be used to form an integral contact electrode. The upper punch *c* is then re-inserted, and the assembly is placed into a container *d* fitted with an induction heating coil *e*, a lagging layer *f* of alumina being interposed between the container *d* and the graphite die *a*. *g* is a sight-tube leading into the die block *a* for purposes of temperature measurement. Current is then passed through heating coil *e*, while pressure is applied at the same time to force the punches *b* and *c* towards each other to effect sintering under pressure of the three layers in the mould cavity and thus to form an integral block having a central portion of the resistance material according to the invention integrally connected to contact-forming end portions of a conductive molybdenum-disilicide and alumina layer.

The die is heated to 1680° C. while a pressure of 1 ton per square inch is applied to the compact, and maintained at that temperature until sintering is complete as evidenced by the virtual cessation of the movement of the press platen.

After cooling, the compact is extracted from the die and all surfaces are ground until clean of adherent carbon.

Leads may be attached by brazing using conventional methods.

Typical properties of a resistor prepared in the above manner are:

| | |
|---|---|
| Value | 100 ohms—10 megohms. |
| Temperature coefficient | 0.04—0.08%/°C. |
| Voltage coefficient | 0.08—0.15%/Volt. |
| Noise | Better than 2 $+\log_{10} \frac{R}{1,000}$ microvolts/volt. (I.e. Grade II.) |
| Oxidation resistance | Less than 1% change on heating for 1,000 hrs. at 400° C. in air. |

It should be clearly understood that the invention is not limited to all the details of the embodiment specifically described. Thus, for example, the percentage of molybdenum disilicide in the resistive body may vary from about 15% to about 30% and the percentage of elemental carbon in the resistive body can vary from ½ to 3% by weight. Alternatively the percentage of elemental carbon in the mixture can vary from 2 to 3% by weight, in which case the molybdenum disilicide content would vary from 20 to 28% by weight Furthermore, since the resistor body is intrinsically oxidation-resistant the value of any resistor may be increased by up to a factor of 5 by grinding down the resistor body to reduce its cross-section. This permits the resistance values to be adjusted to close tolerances.

Where the resistors according to the invention are provided with a low-resistance end portion containing sufficient molybdenum disilicide for the portion to be conductive independently of any incorporation of carbon, it is nevertheless preferred to embody elemental carbon in the said end portions, preferably by using in the mixture alumina particles which have been coated with a carbon film. This has been found to improve the conduction of current between the end portions and the resistive main body.

What we claim is:

1. An electrical resistor which comprises a resistive body consisting of a compact sintered insulating mixture of molybdenum disilicide particles and alumina particles containing 15 to 30% by weight of molybdenum disilicide, adjacent molybdenum disilicide particles being separated by alumina particles, wherein the insulation between adjacent molybdenum disilicide particles is bridged resistively by the incorporation of elemental carbon in the sintered mixture, the elemental carbon forming ½ to 3% by weight of the mixture.

2. A sintered resistive compact mixture of molybdenum disilicide particles and alumina particles the molybdenum disilicide forming 20 to 28% by weight of the mixture and 2 to 3% by weight of elemental carbon, the mixture ratio of the molybdenum disilicide particles and alumina particles being such as would, in the absence of the carbon, produce a sintered body of insulating character.

3. The electrical resistor of claim 1 which has been ground to reduce its cross-section.

4. A sintered resistive compact mixture of which ½ to 3% percent by weight consists of carbon, the remainder being an alumina and molybdenum disilicide mixture containing 15 to 30 weight percent of molybdenum disilicide.

5. A sintered resistive compact mixture of which 2 to 3 percent by weight consists of carbon, the remainder being an alumina and molybdenum-disilicide mixture containing 20 to 28 weight percent of molybdenum disilicide.

6. A method of making resistor material that is suitable for use at high temperatures, which comprises forming a powderous mixture containing 15 to 30% by weight of molybdenum disilicide particles, alumina particles and ½ to 3% by weight of elemental carbon and sintering the said mixture under compression pressure to form a compact sintered resistive body.

7. The method of claim 6, wherein the sintering under pressure is effected in a graphite die.

8. The method of claim 6, wherein the mixture is cold-pressed and then sintered in an inert atmosphere without substantial mechanical compression.

9. The method of claim 6 wherein parts of the mould are filled with a molybdenum disilicide and alumina mixture richer in molybdenum disilicide the molybdenum disilicide content forming from 100% to 50% by weight whilst the alumina content varies between 0 to 50% by weight for low-resistance connection to external conductors.

10. The method of claim 9, wherein said richer mixture contains 50% by weight of molybdenum and 50% by weight of alumina.

11. The method of claim 9, wherein contact-forming end portions are formed substantially wholly of molybdenum disilicide.

References Cited in the file of this patent
UNITED STATES PATENTS
2,622,304    Coffer _____ Dec. 23, 1952